United States Patent

[11] 3,589,258

| [72] | Inventor | Henry J. Koeber<br>Deerfield, Ill. |
|---|---|---|
| [21] | Appl. No. | 780,094 |
| [22] | Filed | Nov. 29, 1968 |
| [45] | Patented | June 29, 1971 |
| [73] | Assignee | Bell & Howell Company<br>Chicago, Ill. |

[54] LIGHT CONTROL MEANS IN A CAMERA
2 Claims, 4 Drawing Figs.

| [52] | U.S. Cl. | 95/64, 352/141 |
|---|---|---|
| [51] | Int. Cl. | G03b 9/06 |
| [50] | Field of Search | 95/10 C, 64, 64 D; 352/141 |

[56] References Cited
UNITED STATES PATENTS

| 3,006,265 | 10/1961 | LaRue, Jr. | 95/64 (D) |
| 3,033,093 | 5/1962 | Stimson et al. | 95/64 (D) |
| 3,072,035 | 1/1963 | Martin | 95/64 (D) |
| 3,183,814 | 5/1965 | Vess et al. | 95/64 (D) |
| 3,456,570 | 7/1969 | Heinzmann | 95/64 (D) |
| 3,505,937 | 4/1970 | Albedyll et al. | 95/10 (C) |

*Primary Examiner*—Samuel S. Matthews
*Assistant Examiner*—Joseph F. Peters, Jr.
*Attorney*—William F. Pinsak ABSTRACT: Light reducing areas, on a filter effective for outdoor lighting conditions, block light passage to a film plane from one or more extra-aperture slots generated by an iris when set at an intermediate aperture condition, thereby preventing the image degrading effects caused by light passing through the said slotlike openings.

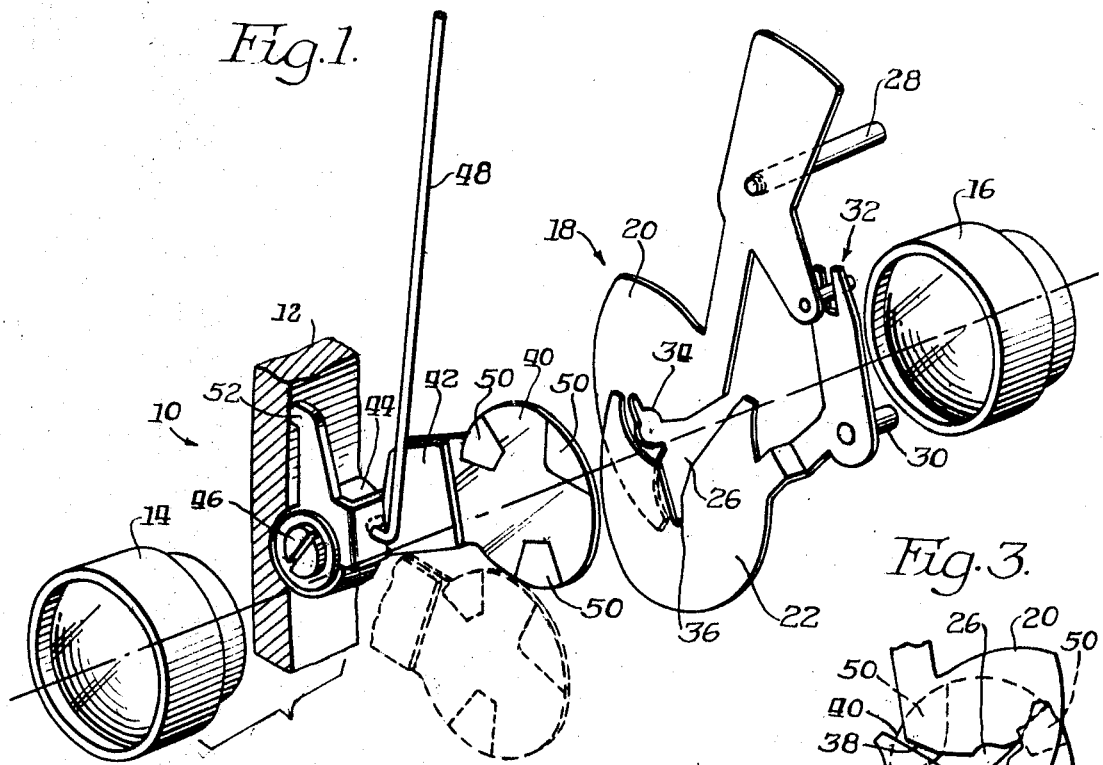
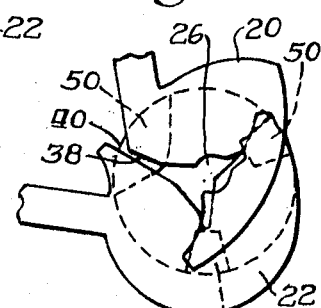
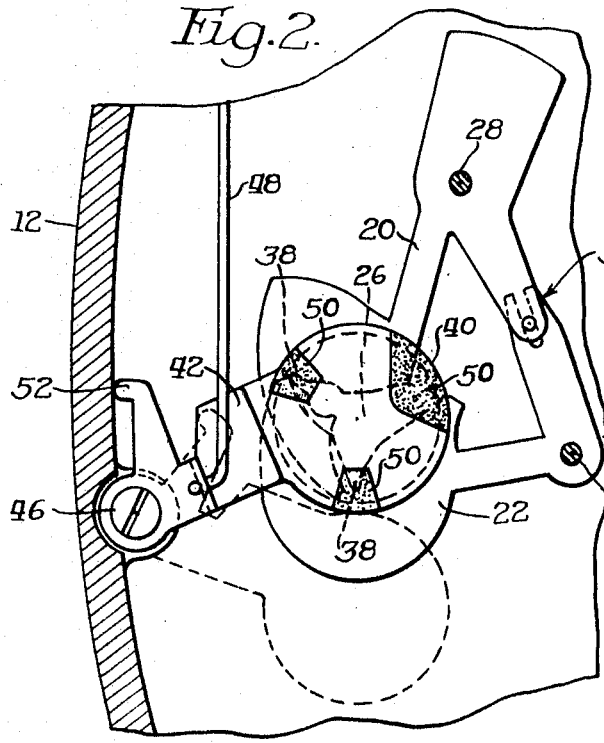
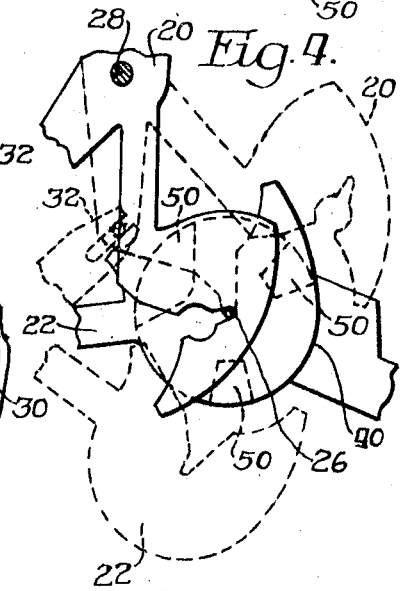
INVENTOR.
Henry J. Koeber

LIGHT CONTROL MEANS IN A CAMERA

The present invention relates to light control apparatus in a motion picture camera and the like. Particularly, the invention relates to a combination for blocking light passage to a film through an extra-aperture opening in the iris of a camera.

A conventional iris of a motion picture camera comprises an opaque blade adjustable relative another blade or a mask to at least three conditions for providing a range of corresponding aperture dimensions for passing light reflected from a subject to the film plane of the camera. Because of the irregular form of conventional iris blades, the iris generates one or more narrow extra-aperture slots or openings during outdoor photography when conditioned for an aperture of intermediate size. Each slot or opening tends to diffract light in consequence of which image formation in the film plane of the camera is "softened" or degraded.

Solution of the problem is especially important because greatest outdoor uses of a camera occur when an iris is in extra-aperture slot or opening forming condition. Prior attempts at eliminating the aforedescribed undesirable condition by changing the shapes of conventional iris blades have been unsuccessful because the resulting blade shapes are inefficient, and because of other problems not relevant to the present invention.

It is an object of the present invention to provide improved light control in a camera.

It is another object of the invention to prevent degraded image formation resulting from passage of light to the film plane in a camera through an extra-aperture slot or opening formed by an iris of conventional construction.

To effect the foregoing objects, a camera has an adjustable iris which defines an aperture and an opening adapted to transmit light toward its film plane. A filter is selectively movable into and out of the light path. A light reducing area on the filter is arranged to block the light normally admitted through the opening when the filter is out of the light path.

Further and other objects will be apparent from the description of the accompanying drawings in which like numerals refer to like parts.

In the drawings:

FIG. 1 is an exploded perspective view of part of a camera embodying the present invention, a filter shown in solid and in dashed lines to illustrate alternate positions.

FIG 2 is a fragmentary view of said camera, looking toward its rear from its front, and illustrating the filter in elevation and an iris in an intermediate condition.

FIG. 3 is an elevational view of the iris in another intermediate condition different from the condition of FIG. 2 and looking toward the front of the camera from its rear.

FIG. 4 is a view similar to FIG. 3 and showing the iris in solid lines and in dashed lines to form a pair of further aperture conditions.

Referring now more particularly to the drawings, shown is only a portion of camera 10 sufficient to understand the invention. Exemplary camera 10 has casing 12 and an optical system comprised of a pair of lens members 14 and 16 which are disposed in optical alignment and spaced apart longitudinally of the optical axis of the camera. The character of members 14 and 16 is not critical to the invention. They may comprise, for example, spaced apart components of a single focal length system, in which event the members 14 and 16 together would comprise an objective, or, they may comprise, respectively, an afocal attachment or collimating means and a prime lens or objective. In the illustrated embodiment, member 14 is adapted for receiving reflected light from a subject to be photographed and for transmission of the reflected light in a path along the optical axis to member 16 for passage toward the film plane (not shown) of a camera.

A diaphragm or iris, hereinafter referred to as iris 18, is comprised of a plurality of coacting blades 20 and 22 which are rockably mounted between lens members 14 and 16. Blades 20 and 22 are relatively adjustable and are arranged to be disposed in overlapping association to form an aperture 26 about the optical axis. In consequence of the adjustability of the blades, a range of aperture opening sizes is attainable for controlling the quantity of light transmitted from lens member 14 to lens member 16.

In FIG. 4, the solid line condition of the iris shows when the smallest aperture is generated, while the dashed line condition of the iris shows when the widest aperture is generated as often exists for indoor photography. In FIGS. 1 and 2, the iris is conditioned for an aperture of intermediate size.

Blades 20 and 22 may be manually or automatically adjusted. Herein they are shown rockable respectively about a pair of pivots 28 and 30. A link 32 couples the blades in a manner such that they are adjustable uniformly to correspondingly effect aperture size. It is not necessary, however, that the iris comprise a pair of adjustable blades inasmuch as variation of aperture size may be effectuated through the well-known expedient of a single movable iris blade and a stationary mask.

Each of corresponding marginal or edge portions 34 and 36 of blades 20 and 22, is fashioned in the well-known modified teardrop design, which has proved highly efficient for aperture formation. One shortcoming of the design, however, is that in certain intermediate conditions of the iris existing during outdoor photography, one (FIG. 3) or more (FIG. 2) extra-aperture narrow slots or openings 38 are generated. The character of each of the slots or openings is such that it tends to diffract light. This latter effect tends to degrade an image and accordingly any photograph from such diffracted light.

In accordance with the present invention, this undesirable condition is prevented. To that end, a filter 40 is rigidly secured to a bracket 42 which is journaled on a casing extension 44 by means of a pivot 46. In consequence thereof, filter 40 is arranged for rocking between a first condition (solid line in FIG. 1) in which it is disposed across the optical axis in the path of all light transmitted from lens member 14, and a second condition (dashed line in FIG. 1) in which the filter is disposed wholly out of the light path.

Filter 40 may be conventional, such as a Type A filter, for enabling use of the camera under outdoor daylight conditions with color film which is adapted for indoor use in artificial light. Accordingly, because of its color-altering characteristics, filter 40 would be disposed out of the optical axis light path for indoor photography.

For controlling the condition of the filter, a link or rod 48 is rigidly connected to bracket 42 for rocking the filter about pivot 46. An integral extension 52 of the bracket is proportioned for engaging casing 12 into limit movement of filter 40 to a bust or centered condition with respect to the optical axis.

A plurality of light reducing areas 50 are carried on the filter at or near its periphery. In the present embodiment, areas 50 are opaque and are arranged and proportioned to block light which would pass through slots or openings 38 if the filter were not disposed in the light path. In the exemplary embodiment, areas 50 are discrete, and extend inwardly about half the radius of the filter so that when the filter is disposed in its first condition, the opaque areas are in aligned with and overlap the slots or openings. The light reducing areas 50, however, may be merged into a single ring formed adjacent the periphery of the filter.

It is appreciated that a less than opaque, neutral density material is considered to be the equivalent of the opaque material of areas 50, it being the object, of course, to prevent a degraded picture.

The arrangement and proportioning of light reducing areas 50 is such that filter 40 need not be moved to its second condition out of concern that the light path will be needlessly blocked. That is to say, areas 50 are proportioned so that light passage to lens member 16 will not be blocked when the iris is conditioned to generate the small aperture. On the other hand, while areas 50 will be disposed for blocking light through aperture 26 when aperture size is maximum (dashed line of FIG. 4), the amount of light then blocked will be too small to have an appreciable or undesirable effect on the picture formed.

While the filter will be disposed in its second condition during indoor photography, image degradation from light through slots is not then a problem because aperture 26 will be in its widest condition when no slots are formed.

What I claim is:

1. In a camera having an adjustable iris defining an aperture opening adapted to transmit light toward the film plane of the camera, and a filter arranged for selective movement into and out of the light path, the iris having blades arranged for movement between a minimum aperture condition and having an intermediate condition in which said aperture opening is generated to effect light passing through said iris and through additional areas radially extending from said aperture opening, the improvement comprising:

discrete light reducing areas located on said filter adjacent the periphery thereof for blocking light normally admitted through said radially extending areas when said filter is out of the light path.

2. A combination according to claim 1 in which said light reducing areas are substantially opaque.